(12) United States Patent
Pang et al.

(10) Patent No.: US 10,483,808 B2
(45) Date of Patent: Nov. 19, 2019

(54) ENVIRONMENTAL ENERGY ABSORPTION SYSTEM AND METHOD

(71) Applicants: Arthur Xing Pang, Pierrefonds (CA); Quan Wang, Pierrefonds (CA)

(72) Inventors: Arthur Xing Pang, Pierrefonds (CA); Quan Wang, Pierrefonds (CA)

(*) Notice: Subject to any disclaimer, the term of this patent is extended or adjusted under 35 U.S.C. 154(b) by 370 days.

(21) Appl. No.: 15/069,959

(22) Filed: Mar. 14, 2016

(65) Prior Publication Data
US 2016/0268851 A1    Sep. 15, 2016

Related U.S. Application Data

(60) Provisional application No. 62/133,104, filed on Mar. 13, 2015.

(51) Int. Cl.
*H05K 7/14* (2006.01)
*H02J 50/20* (2016.01)

(52) U.S. Cl.
CPC .................... *H02J 50/20* (2016.02)

(58) Field of Classification Search
CPC .. H02J 7/025; H02J 50/12; H02J 50/80; H02J 5/005
See application file for complete search history.

(56) References Cited

U.S. PATENT DOCUMENTS

| | | | | |
|---|---|---|---|---|
| 9,780,604 B1* | 10/2017 | Zeng | ........................ | H02J 50/10 |
| 2008/0079396 A1* | 4/2008 | Yamazaki | .......... | G06K 19/0702 |
| | | | | 320/128 |
| 2010/0315050 A1* | 12/2010 | Goder | ................... | H02M 3/155 |
| | | | | 323/282 |
| 2011/0140540 A1* | 6/2011 | Chu | ........................ | H02J 17/00 |
| | | | | 307/104 |
| 2013/0281155 A1* | 10/2013 | Ogata | .................. | H04B 1/3883 |
| | | | | 455/556.1 |
| 2015/0364944 A1* | 12/2015 | Garcia Briz | ............ | H02J 5/005 |
| | | | | 307/104 |

* cited by examiner

*Primary Examiner* — Sibin Chen
(74) *Attorney, Agent, or Firm* — Lavery, De Billy, LLP; Gonzalo Lavin

(57) ABSTRACT

An environmental energy absorption system for providing power to an electronic device comprising a remote station that includes an energy receiver; an energy converter for converting the received energy into electrical power and an energy storage element for storing the electrical power. The device uses environmental energy absorption to power the electronic device in the absence of a power supply source.

9 Claims, 4 Drawing Sheets

ENVIRONMENTAL ENERGY ABSORPTION SYSTEM AND METHOD

CROSS-REFERENCE TO RELATED APPLICATIONS

This application claims the benefits of U.S. provisional patent application No. 62/133,104 filed on Mar. 13, 2015, which is herein incorporated by reference.

TECHNICAL FIELD

The present disclosure relates to an environmental energy absorption system and method. In one particular embodiment, the present disclosure relates to a sensor system powered wirelessly.

BACKGROUND

Electronic devices, such as sensor systems, require power to maintain their operation. Sensor systems are key for information collection and with the development of networking technology they have been widely used to monitor hard to access spaces, for example small, hidden, moving and/or permanently closed spaces. There is increasing need to monitor such spaces. Because of the inaccessible nature of those spaces, monitoring systems require a wireless connection as well as a long-term wireless power supply to maintain an effective radio transmission of collected sensor information. However, current sensor systems are powered using batteries, which have a short-term life span, or a wired power connection. Long-term power supply issues hinder the widespread use of sensor systems in remote or hard to access spaces. Other electronic devices, such as mobile phones, encounter the same power supply issues.

Accordingly, there is a need for a system and method for proving power using environmental energy absorption and in particular providing power to a sensor system wirelessly.

SUMMARY

It is an object of the present disclosure to solve the deficiencies of the prior art electronic device power supplies, there is disclosed a wireless electronic device power supply using environmental energy absorption technology to power the electronic device in order to provide long-term power to the electronic device in the absence of power supply line.

Accordingly, in accordance with an illustrative embodiment of the present disclosure, there is provided an environmental energy absorption system for providing power to an electronic device, comprising:
  a remote station including:
    an energy receiver;
    an energy converter for converting the received energy into electrical power; and
    an energy storage element for storing the electrical power.

There is also provided an environmental energy absorption system as above, wherein the energy receiver is a microwave receiving antenna for receiving microwave pulses and the energy converter is a microwave energy converter for converting the received microwave energy into electrical power.

There is further provided an environmental energy absorption system as above, wherein the energy converter includes:
  a field sensor for detecting electromagnetic fields present in the environment;
  a voltage doubler for increasing the voltage from the field sensor to a predetermined range;
  a field regulator for preventing excessive voltage fluctuations from the voltage doubler; and
  an accumulator for accumulating the regulated voltage, the accumulator having a diode with a high resistance reverse characteristic for ensuring one-way flow of electrical energy to the energy storage element.

There is further still provided an environmental energy absorption system as above, further comprising:
  a base station including:
    a power supply;
    a microwave energy modulation transmitter for modulating the electrical energy from the power supply into individual microwave pulses; and
    a microwave transmitting antenna for transmitting the individual microwave pulses.

In accordance with an illustrative embodiment of the present disclosure, there is provided an environmental energy absorption method for providing power to an electronic device, comprising the steps of:
  receiving energy from energy from an environment;
  converting the received energy into electrical power; and
  storing the electrical power.

There is also provided an environmental energy absorption method as above, wherein the energy received is in the form of microwave pulses.

There is further provided an environmental energy absorption method as above, wherein the step of converting the received energy into electrical power includes the sub-steps of:
  detecting electromagnetic fields present in the environment;
  increasing the voltage of the received energy to a predetermined range;
  regulating the voltage of the received energy in order to prevent excessive voltage fluctuations; and
  accumulating the regulated voltage.

There is further still provided an environmental energy absorption method as above, further comprising, previous to the step of receiving energy from energy from an environment, the steps of:
  modulating electrical energy from a power supply into individual microwave pulses; and
  transmitting the individual microwave pulses.

BRIEF DESCRIPTION OF THE FIGURES

Embodiments of the disclosure will be described by way of examples only with reference to the accompanying drawing, in which.

DETAILED DESCRIPTION

Generally stated, the non-limitative illustrative embodiments of the present disclosure provide an environmental energy absorption system using, for example, microwave energy, which allows for the providing of long-term/on-demand power to remote electronic devices, such as sensor systems, without the use of power cables or batteries.

The present system and method use either environmental energy or transmitted wave energy to provide power to a remote electronic device, for example electromagnetic waves in a frequency range from low to high frequency until light wave. Depending on the specific implementation, the wireless energy provided can be modulated to suitable form and frequency by transmitter modulation and then transmitted directly. The remote electronic device is provided with an energy receiver/converter that converts the received waves into the corresponding power supply voltage required by the remote electronic device.

The energy receiver/converter can be configured to receive a specific energy transmitted by energy modulator/transmitter or energy already existing in the surrounding space. The various forms of multi-band energy receivers/converters combine to form a broad-spectrum energy acceptance receiver/converter. Electronic devices, such as sensor systems, provided with the disclosed system and method do not depend anymore on external energy supplies and thus full connection with the outside world can be achieved without the use of wires. There are no more worries concerning battery life or how to replace the battery in sensor systems that are disposed in some isolated inaccessible spaces. The wireless power system and method relieves the battery dependency of sensor systems, which commonly need to carry their own battery, such as wireless capsule endoscopy, tire pressure monitors, etc. In an alternative embodiment, the wireless power system and method may be used to extend the charge cycle of battery-powered devices. For example, if a smart phone is provided with the wireless power system and method, it can take full advantage of the space to absorb electromagnetic radiation, light, sound, vibration energy, to extend its standby time.

Figure 1:
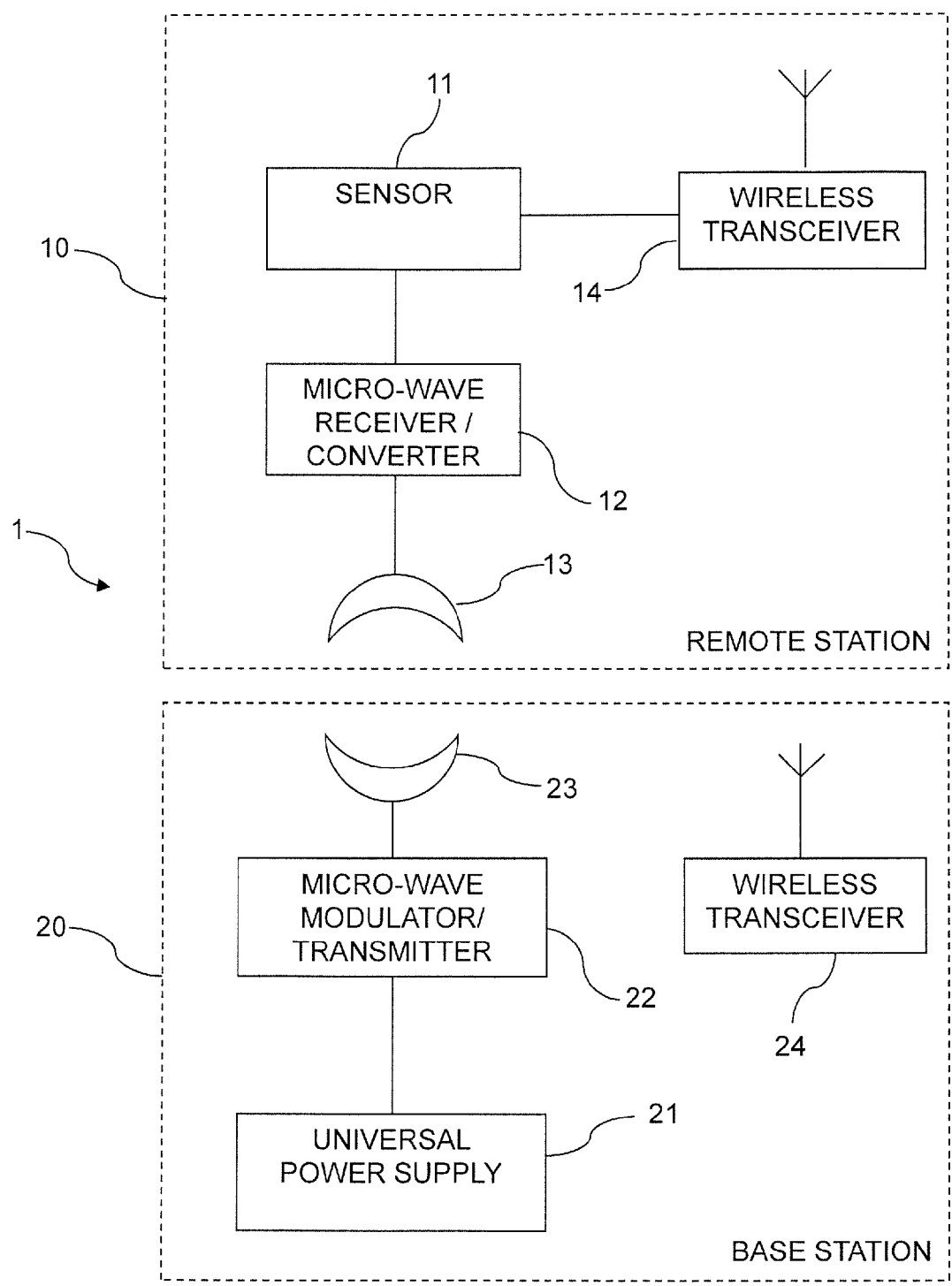
FIG. 1 is a schematic representation of a sensor system having a wireless power supply in accordance with an illustrative embodiment of the present disclosure.

Referring to FIG. 1, there is shown a sensor system having a wireless power supply 1 in accordance with an illustrative embodiment of the present disclosure. The sensor system 1 comprises a remote station 10, to be located in a remote or hard to access space, and a base station 20.

The remote station 10 includes a sensor 11, a microwave energy receiver/converter 12, a microwave receiving antenna 13 and a wireless signal transceiver 14, while the base station 20 includes an electrical energy from universal power supply 21, a microwave energy modulator/transmitter 22, a microwave transmitting antenna 23 and a wireless signal transceiver 24. It is to be understood that in an alternative embodiment the wireless signal transceiver 24 may be provided separately from the base station 20, provided with a processor for processing information provided by the sensor 11 and/or that multiple wireless signal transceivers 24 may be used.

In use, the microwave energy modulator/transmitter 22 modulates the electrical energy from the universal power supply 21 into individual microwave pulses that are transmitted by the microwave transmitting antenna 23. The transmitted microwave pulses are received by the microwave receiving antenna 13 and then provided to the microwave energy receiver/converter 12, which converts the transmitted microwave energy into electrical power to power the sensor 11 and the wireless signal transceiver 14. It is to be understood that in an alternative embodiment the electrical power provided by the receiver/converter 12 may be used to power other devices.

The sensor 11 can be, for example, an image sensor (e.g. a CCD, CMOS other image sensor), audio sensor, liquid sensor, gas sensor, temperature sensor, movement detector or other type of sensor, advantageously a low power sensor. Information collected by the sensor 11 is transmitted through the wireless signal transceiver 14 to the wireless signal transceiver 24, which in turn may provide the sensor 11 information to a further system or device.

The remote station 10 is powered solely by the microwave energy transmitted from the microwave transmitting antenna 23 to the microwave receiving antenna 13, it does not require any battery nor any wired connection to the outside world. Accordingly, the remote station 10 can operate in spaces completely isolated from the outside world, while still allowing the monitoring of those spaces.

Electromagnetic fields are present in the environment in all energy bands, the most direct one being generated by the sun. The environment is also permeated by all kinds of electromagnetic field noise artificially enhanced in particular by the development of wireless communication technologies. This energy can be harvested from the environment by an induction effect to convert electromagnetic fields to electrical energy.

Figure 2:
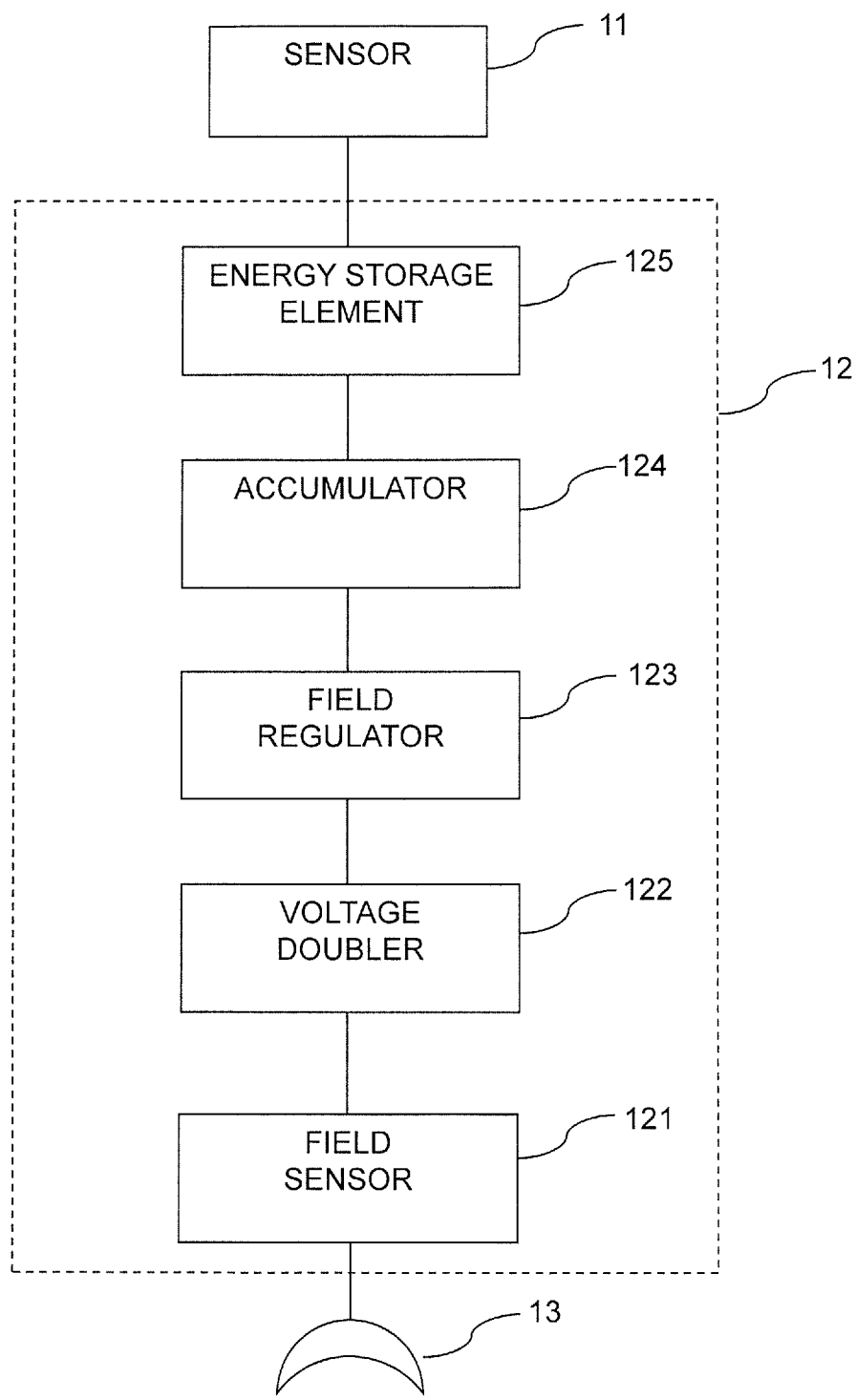
FIG. 2 is a schematic representation of the microwave energy converter receiver of the sensor system of FIG. 1 in accordance with an illustrative embodiment of the present disclosure.

Referring now to FIG. 2, there is shown the microwave energy receiver/converter 12 in accordance with an illustrative embodiment of the present disclosure. The microwave energy receiver/converter 12 includes a field sensor 121, a voltage doubler 122, a field regulator 123, an accumulator 124 and a battery/capacitor 125 or other energy storage element.

The field sensor 121, is used to detect various electromagnetic fields present in the environment. In the case where the detected electromagnetic field is week, the field sensor 121 activates the voltage doubler 122 in order to increases the voltage to the required system operating range.

The field regulator 123 prevents excessive voltage fluctuations coming from the voltage doubler 122, which could damage the microwave energy receiver/converter 12, and keeps the voltage in a desired operational range. These fluctuations are caused by instability in the electromagnetic fields.

The accumulator 124 accumulates the regulated voltage. It includes a diode with a high resistance reverse characteristic, which ensures one-way flow of electrical energy to the energy storage element 125, for example a rechargeable battery, a capacitor, etc. When the energy storage element 125 power meets the needs of an operation cycle of the sensor 11, the remote station 10 is awakened.

In an alternative embodiment, the microwave energy converter receiver 12 can be imbedded in various electronic devices having a battery in order to extend its charge cycle using wireless power. For example, a smart phone may use ambient energy converted by an embedded microwave energy converter receiver 12, taking full advantage of ambient electromagnetic radiation, light, sound, vibration energy, etc. to extend the standby time of the smart phone.

Figure 3:
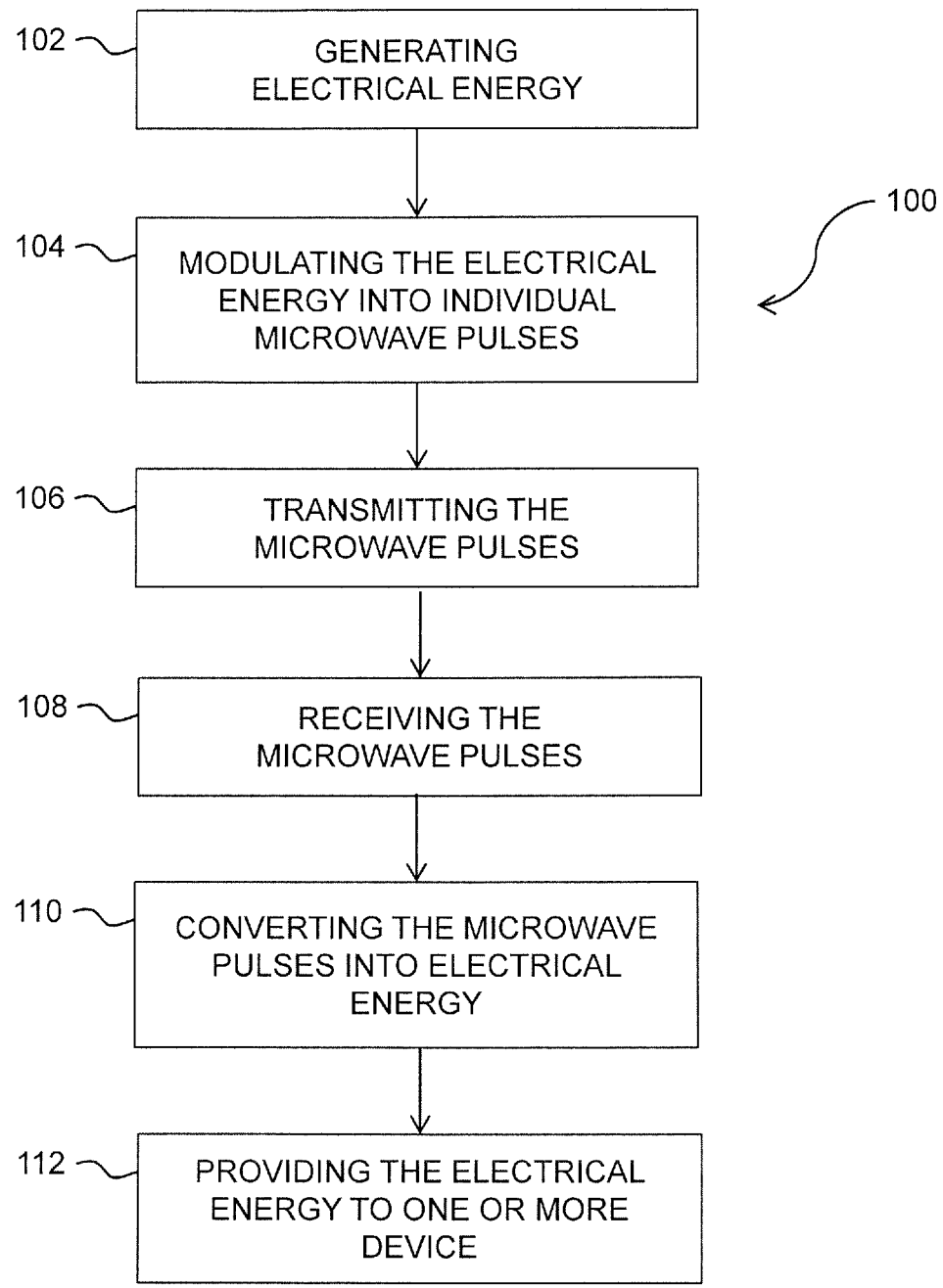
FIG. 3 is a flow diagram of the wireless power generation process in accordance with an illustrative embodiment of the present disclosure.

Referring now to FIG. 3, there is shown a flow diagram of an illustrative example of the wireless power generation process 100. Steps of the process 100 are indicated by blocks 102 to 112.

The process 100 starts at block 102 where electrical energy is generated, which, at block 104, is modulated and then, at block 106, transmitted.

At block 108 the transmitted microwave pulses are received and, at block 110, converted into electrical power.

Finally, at block 112, the electrical power s provided to one or more device, for example a sensor or other device.

It is to be understood that in an alternative embodiment, steps 102 to 106 may absent, in which case step 108 involves receiving energy already existing in the surrounding space.

Figure 4:
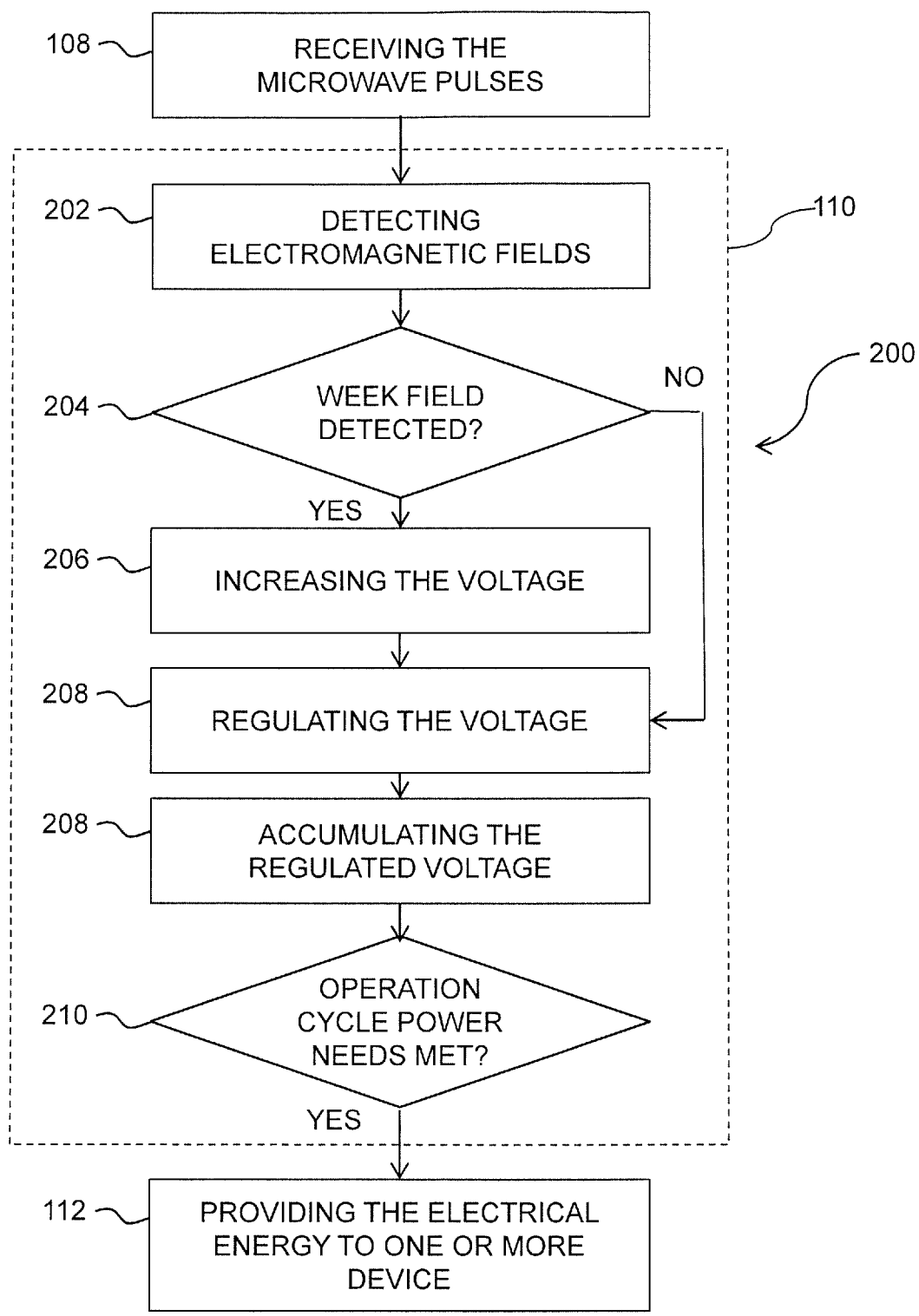
FIG. 4 is a flow diagram of the microwave pulses conversion sub-process in accordance with an illustrative embodiment of the present disclosure.

Referring to FIG. 4, there is shown a flow diagram of an illustrative example of the microwave pulses conversion sub-process 200 of step 110 of process 100 (see FIG. 3). Steps of the sub-process 200 are indicated by blocks 202 to 212.

The sub-process 200 starts at block 202 where electromagnetic fields present in the environment are detected.

At block 204, the sub-process 200 verifies if a detected electromagnetic field is week, in which case, at block 206, the voltage is increased to a required system operating range.

At block 208, the voltage is regulated in order to prevent excessive voltage fluctuations and stay in a desired operational range.

Then, at block 210, the regulated voltage is stored.

Finally, at block 212, the sub-process 200 verifies if the stored voltage meets the needs of an operation cycle of one or more connected device, in which case the sub-process 200 proceeds to block 112 of process 100 (see FIG. 3) where electrical power is provided to the one or more device.

It is to be understood that the use of the term "wireless energy" throughout the disclosure is meant to apply equally to transmitted energy as well as energy present in the environment.

Although the present disclosure has been described with a certain degree of particularity and by way of illustrative embodiments and examples thereof, it is to be understood that the present disclosure is not limited to the features of the embodiments described and illustrated herein, but includes all variations and modifications within the scope and spirit of the disclosure as hereinafter claimed.

What is claimed is:

1. An environmental energy absorption system for providing power to an electronic device, comprising:
    a remote station including:
        an energy receiver configured to receive electromagnetic fields, said electromagnetic fields including relatively weak electromagnetic fields present in the environment and relatively stronger electromagnetic fields from a base station;
        an energy converter for converting the received energy into electrical power, said energy converter comprising a field sensor for detecting the relatively weak electromagnetic fields present in the environment; and
        an energy storage element for storing the electrical power;
    wherein the energy converter includes:
        a voltage doubler for increasing the voltage from the field sensor to a predetermined range;
        a field regulator for preventing excessive voltage fluctuations from the voltage doubler; and
        an accumulator for accumulating the regulated voltage, the accumulator having a diode with a high resistance reverse characteristic for ensuring one-way flow of electrical energy to the energy storage element.

2. An environmental energy absorption system in accordance with claim 1, wherein the energy receiver further comprises a microwave receiving antenna for receiving microwave pulses and the energy converter further comprises a microwave energy converter for converting the received microwave energy into electrical power.

3. An environmental energy absorption system in accordance with claim 2, wherein:
    said base station includes:
        a power supply;
        a microwave energy modulation transmitter for modulating the electrical energy from the power supply into individual microwave pulses; and
        a microwave transmitting antenna for transmitting the individual microwave pulses.

4. An environmental energy absorption system in accordance with claim 3, wherein the base station further includes a wireless signal transceiver.

5. An environmental energy absorption system in accordance with claim 1, wherein the remote station further includes a wireless signal transceiver for transmitting information generated by the field sensor.

6. An environmental energy absorption system in accordance with claim 1, wherein the energy storage element is selected from a group consisting of a rechargeable battery and a capacitor.

7. An environmental energy absorption method for providing power to an electronic device, comprising the steps of:
    detecting relatively weak electromagnetic fields present in the environment;
    receiving energy from said environment at a remote station, said energy being in the form of electromagnetic fields including relatively weak electromagnetic fields present in the environment and relatively stronger electromagnetic fields from a base station;
    converting the received energy into electrical power; and
    storing the electrical power;
    wherein the step of converting the received energy into electrical power includes the sub-steps of:
    increasing the voltage of the received energy to a predetermined range;
    regulating the voltage of the received energy in order to prevent excessive voltage fluctuations; and
    accumulating the regulated voltage.

8. An environmental energy absorption method in accordance with claim 7, wherein the energy received comprises microwave pulses.

9. An environmental energy absorption method in accordance with claim 7, further comprising, previous to the step of receiving energy from energy from the environment, the steps of:
    modulating electrical energy from a power supply into individual microwave pulses; and
    transmitting the individual microwave pulses.

* * * * *